Sept. 25, 1928.  1,685,722
C. A. PARSONS ET AL
INSULATION OF CONDUCTORS USED IN ELECTRICAL APPARATUS
Filed March 19, 1925    5 Sheets-Sheet 1

INVENTORS:
CHARLES A. PARSONS
JESSEL ROSEN

Sept. 25, 1928.　　　　　　　　　　　　　　　　1,685,722
C. A. PARSONS ET AL
INSULATION OF CONDUCTORS USED IN ELECTRICAL APPARATUS
Filed March 19, 1925　　　5 Sheets-Sheet 4
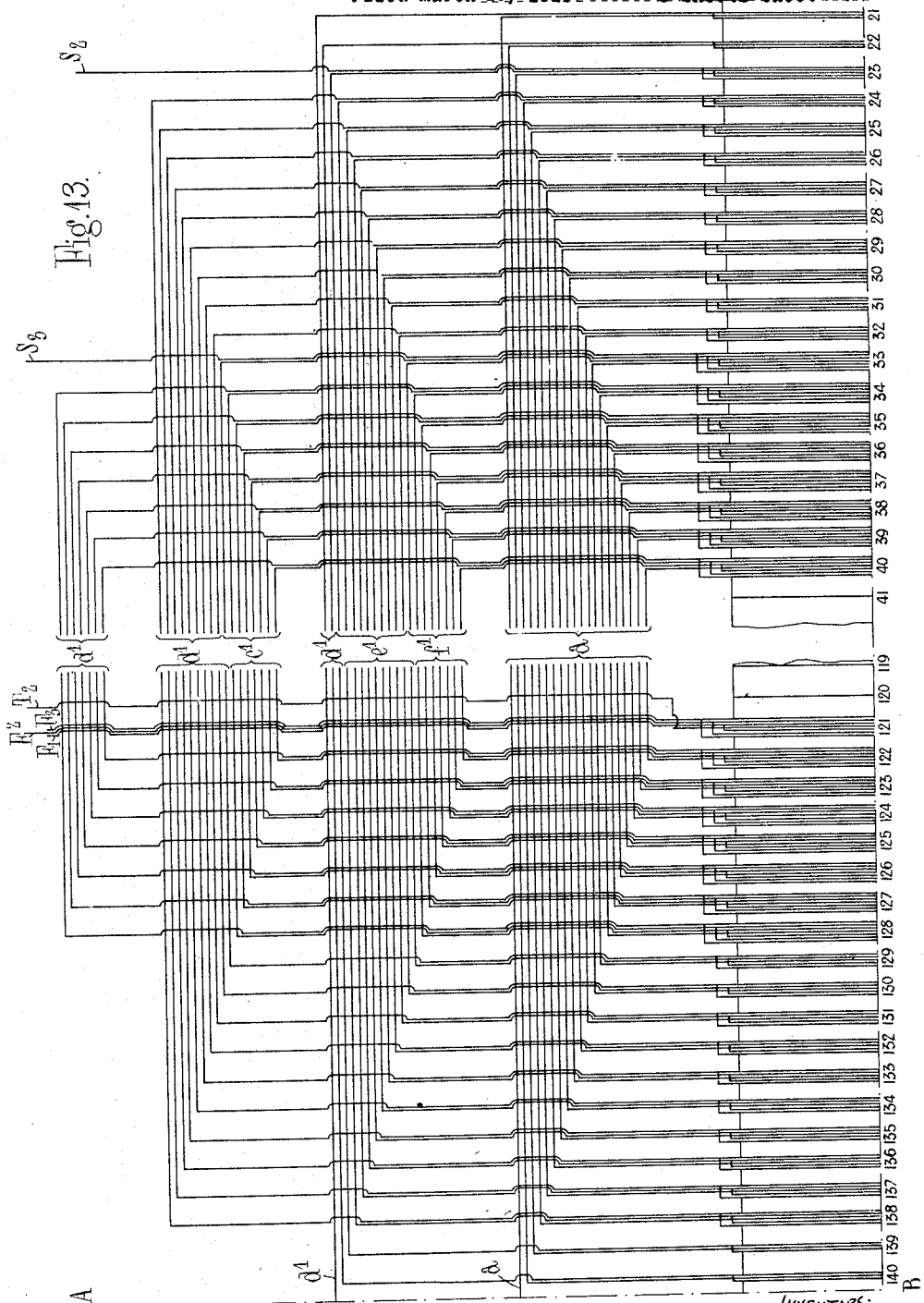

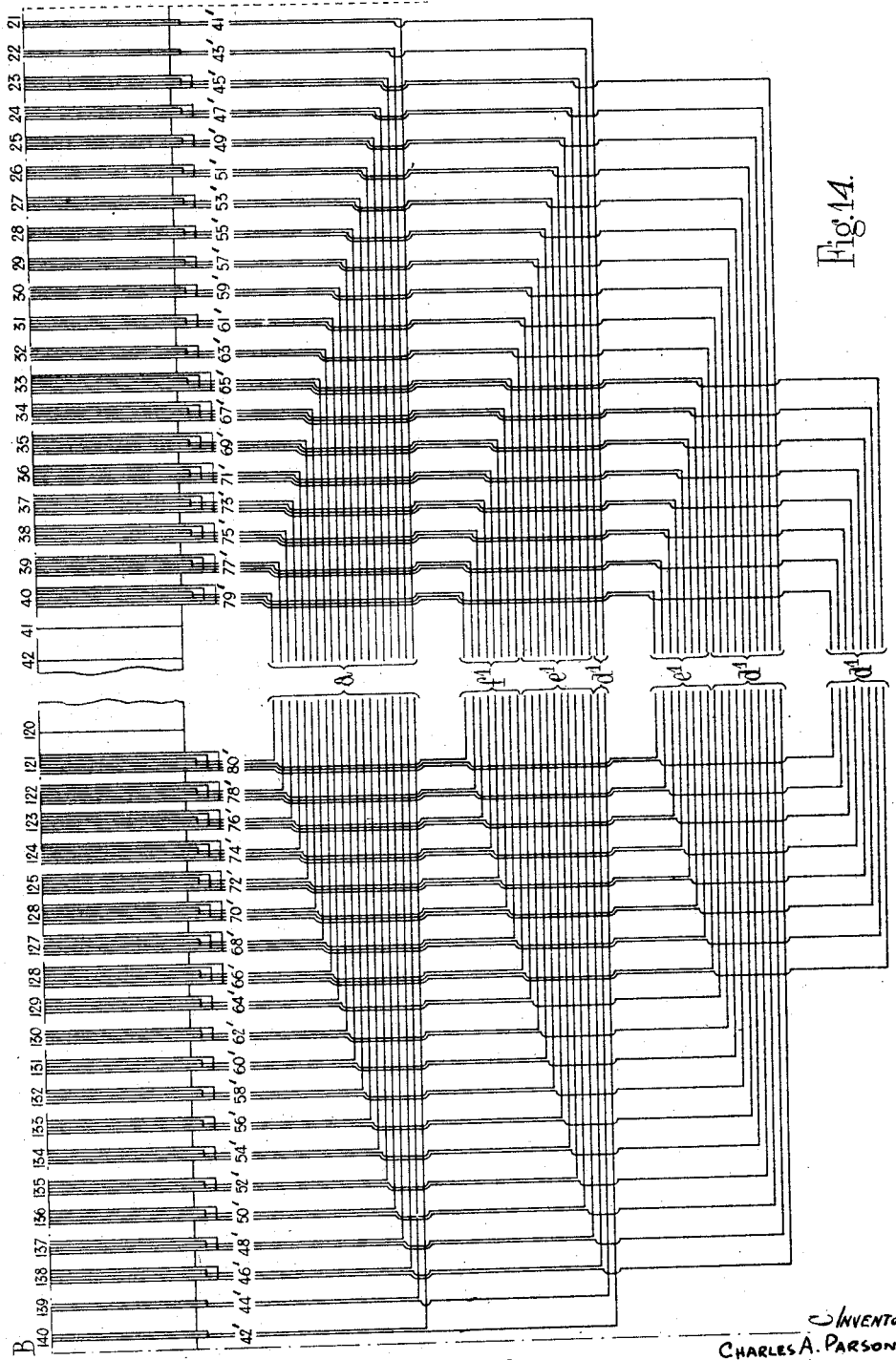

Patented Sept. 25, 1928.

1,685,722

UNITED STATES PATENT OFFICE.

CHARLES ALGERNON PARSONS AND JESSEL ROSEN, OF NEWCASTLE-ON-TYNE, ENGLAND; SAID ROSEN ASSIGNOR TO SAID PARSONS.

INSULATION OF CONDUCTORS USED IN ELECTRICAL APPARATUS.

Application filed March 19, 1925, Serial No. 16,835, and in Great Britain May 1, 1924.

The present invention relates to windings used in electrical apparatus and particularly to those carrying high voltages.

In such apparatus, it is necessary to provide sufficient insulation around the conductors in the portions of the windings subjected to high voltages to withstand the highest potentials generated in or supplied to them. In windings used in dynamo-electric machines, for example, which are subjected to very high potentials, the insulation becomes excessively heavy and therefore the space available for the insulation has to be increased or the area of the conducting elements reduced, both of which alternatives are objectionable.

The present invention has for its object to overcome these objections and consists in the improved arrangements and constructions hereinafter described and more particularly pointed out in the claims.

For convenience, the detailed construction of one example of a winding in accordance with the invention will be described as applied to a dynamo-electric machine.

Referring to the accompanying drawings, which represent diagrammatically by way of example an embodiment of the invention:

Figures 11 to 14 show the application of the invention to a three-phase dynamo-electric machine; the four views when placed together represent a complete developed winding for one phase.

According to one form as illustrated in Figures 1 to 4, the winding is composed of two metallic elements, $a$, $b$, forming separate conducting elements having a cross section of the shape of a compressed D placed back to back, insulating material, $c$, being arranged between the two conducting elements and also completely enclosing them. Windings of any other suitable shape may be employed and each may contain one or more metallic conducting elements.

Figure 1:
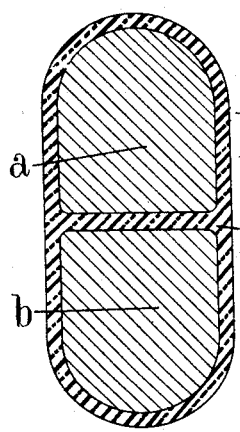
Figure 1 shows the winding in cross section.
Figure 2:
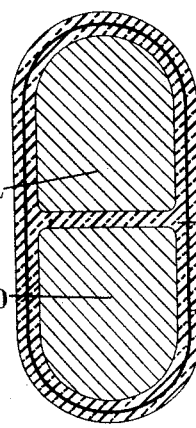
Figure 2 shows the winding in cross section with one annular sheath.
Figure 3:
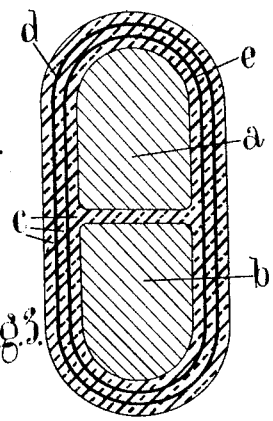
Figure 3 shows the winding in cross section with two annular sheaths.
Figure 4:
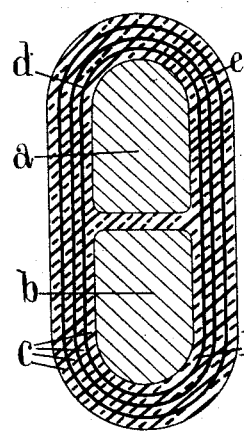
Figure 4 shows the winding in cross section with three annular sheaths.
Figure 5:
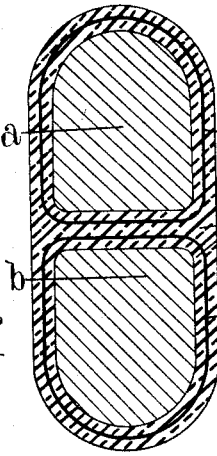
Figure 5 is a modification showing annular sheaths around each individual conducting element of the winding.

Around the insulation of these conducting elements, $a$, $b$, one or more annular or concentric conducting sheaths, $d$, $e$, $f$, as shown in Figures 2, 3 and 4, are provided, alternating with interleaving layers of insulation, $c$, preferably of uniform thickness, the outer sheath, $d$, being surrounded finally by an external layer of insulation, $c$.

Alternatively the conducting elements, $a$, $b$, may each be surrounded with one or more separate sheaths.

Figure 6:
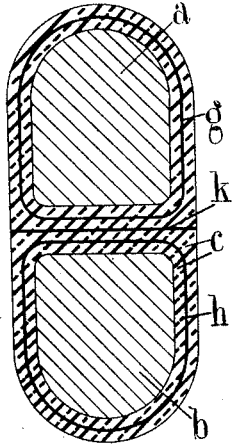
Figure 6 is a modification of Figure 5 showing a sheath between the two individual conducting elements.

An example is illustrated in Figure 6 in which only one sheath, $g$, $h$, is shown around each conducting element, $a$, $b$. In this case an earthing plate, $k$, may be provided between adjacent elements, $a$, $b$, as shown in Figure 6, this being equivalent to a sheath at earth potential. Or again, the winding may contain one conducting element as shown in Figures 7 to 10, and may be provided with one, two, or three conducting sheaths as shown.

The conducting sheaths are preferably made of thin sheet metal in the form of thin ribbon, fine wire or sprayed on metal such as lead tube or the like but instead of being composed of a metallic substance they may be formed of any conducting material, such, for instance, as graphitic paint.

The annular sheaths may be made completely to surround the conducting elements, or they may be split or cut into spirals to reduce eddy losses and need not be circular in form.

An embodiment of the invention, as applied to a 30,000 volt generator, is illustrated diagrammatically by way of example in Figures 11 to 14 which, when placed with their corners marked A A, B B, C C together respectively, show a development of a complete winding of one phase of the three phases, the other two phase windings being identical.

This alternator is conveniently built with 240 slots having one conductor per slot containing one conducting element; the windings of each phase will be distributed between 80 slots, one conducting element in each slot, which conducting elements for convenience will be designated by consecutive numbers. The ends of the main winding are shown at $T_1$ and $T_2$ in the figures. The winding is provided with sheaths around the conducting element in the manner shown in Figures 7 to 10, both the conducting element and sheaths being in inductive relation to the electromagnetic field, but no connections are made between the sheaths and the main windings and the sheaths themselves are connected together in series so as to form separate complete auxiliary windings.

Figure 7:
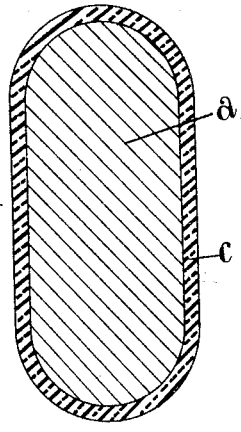
Figure 7 is an enlarged view of a section of the conducting element in Figures 11 to 14.
Figure 8:
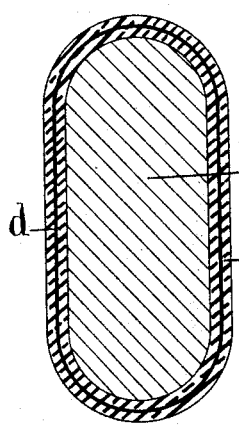
Figure 8 is an enlarged view of a section of the conducting element in Figures 11 to 14 having one sheath.
Figure 9:
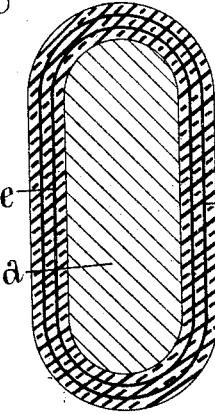
Figure 9 is an enlarged view of a section of the conducting element in Figures 11 to 14 having two sheaths.
Figure 10:
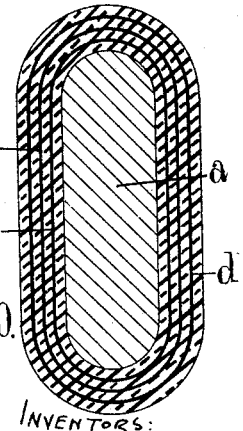
Figure 10 is an enlarged view of a section of the conducting element in Figures 11 to 14 having three sheaths.
Figure 11:
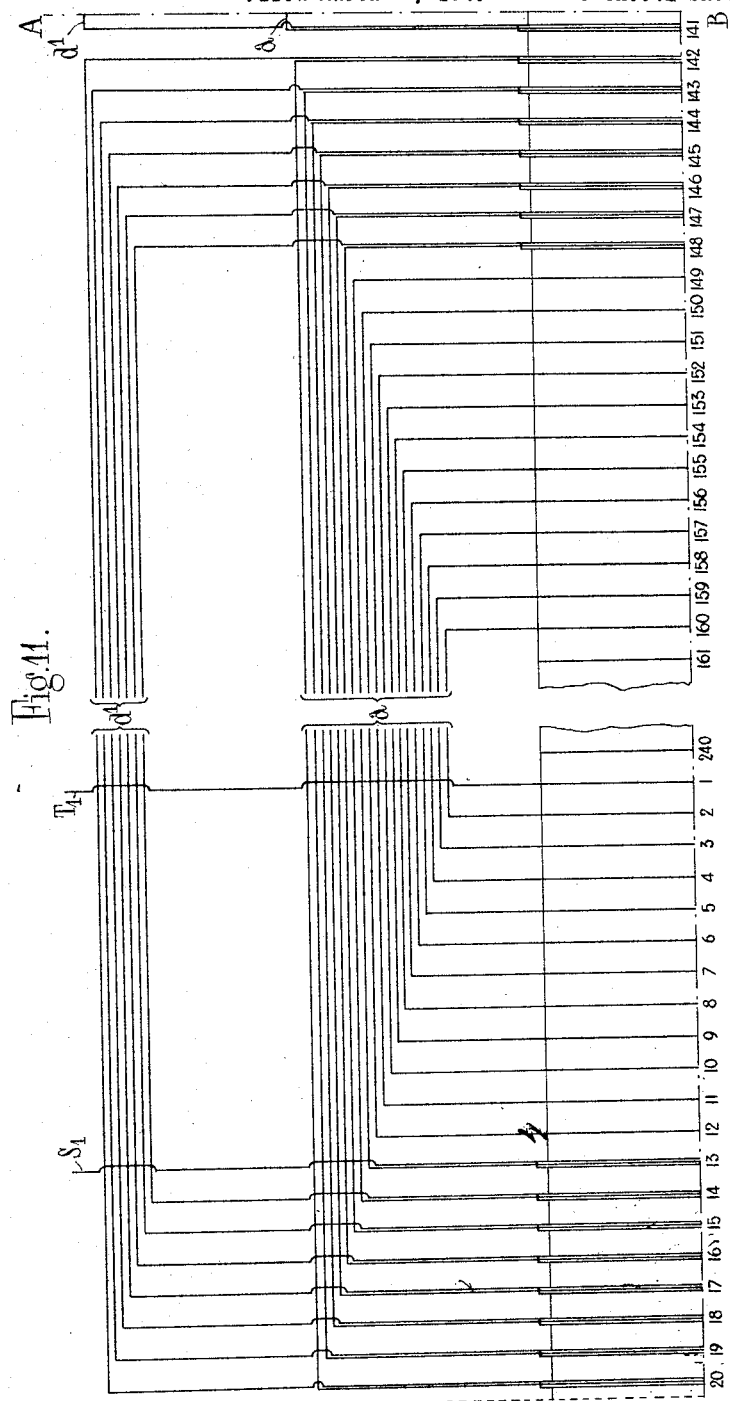
Figure 12:
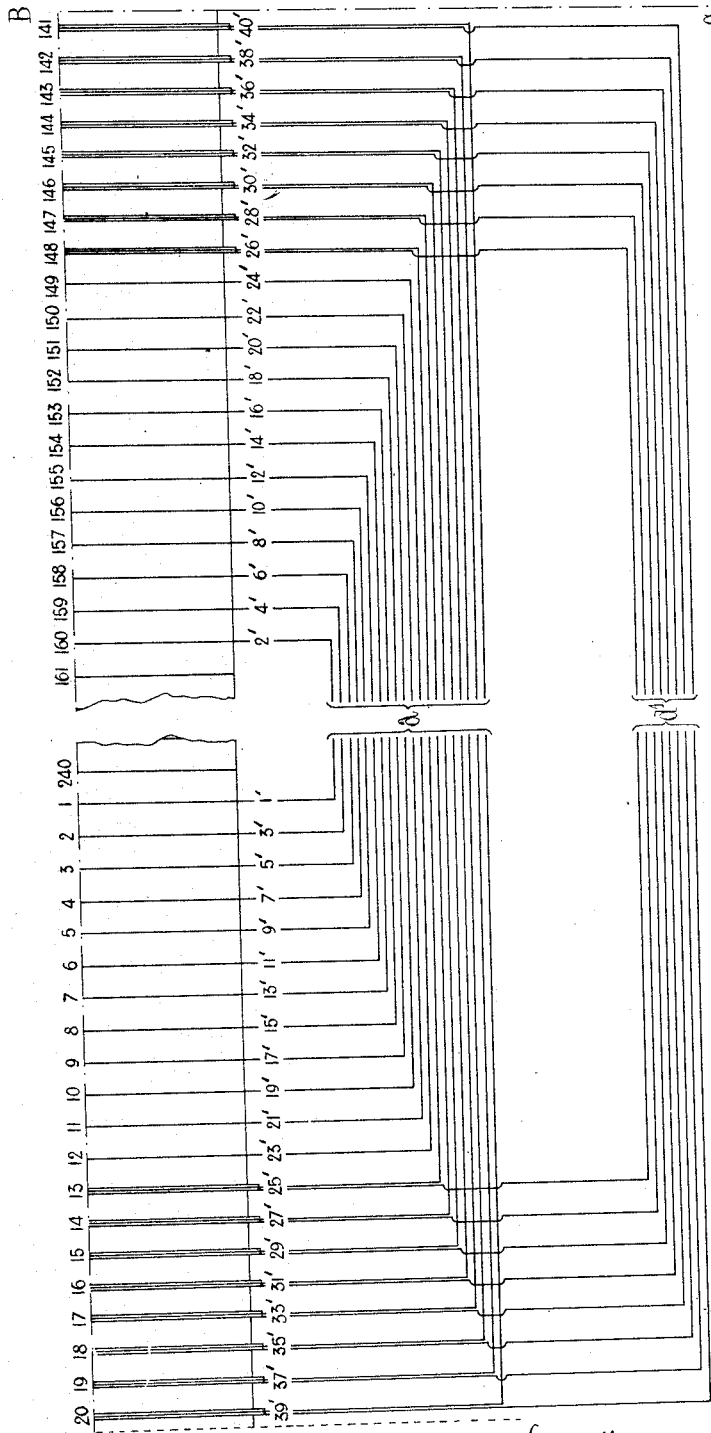

Slots numbered 1 to 40 contain the odd-numbered conducting elements, while slots numbered 121 to 160 contain the even-numbered conducting elements. Odd-numbered conducting elements 1' to 23' and even-numbered conducting elements 2' to 24' have no sheaths around them as shown in Figure 7. Odd-numbered conducting elements 25' to 43' and even-numbered conducting elements 26' to 44' are provided with one sheath, $d$, as shown in Figure 8. Odd-numbered conducting elements 45' to 63' and even-numbered conducting elements 46' to 64' are provided with two sheaths, $d$ and $e$, as shown in Figure 9, while odd-numbered conducting elements 65' to 79' and even-numbered conducting elements 66' to 80' are provided with three sheaths, $d$, $e$, $f$, as shown in Figure 10.

The innermost sheaths, $f$, around conducting elements numbered 65' to 80' inclusive are connected in series by the connections, $f'$; the inner sheaths, $e$, around conducting elements numbered 45' to 64' inclusive are connected in series by the connections, $e'$, and the sheaths, $d$, around the conducting elements numbered 25' to 44' inclusive are connected in series by the connections, $d'$. These three groups are connected in series to form a complete auxiliary winding, $F'$, $S'$, shown in Figures 11 to 14.

The middle sheaths, $e$, around conducting elements numbered 65' to 80' inclusive are connected in series by the connections, $e'$; the outer sheaths, $d$, around conducting elements numbered 45' to 64' inclusive are connected in series by the connections, $d'$, and these two groups are connected in series to form a second complete and separate auxiliary winding, $F^2$, $S^2$, shown in Figures 11 to 14.

The outer sheaths, $d$, around conducting elements numbered 65' to 80' inclusive are connected in series by the connections, $d'$, to form a third complete and separate auxiliary winding, $F^3$, $S^3$, shown in Figures 11 to 14.

Since each auxiliary winding is a series winding the voltage increases uniformly for each turn, the increase being the same as in the main winding since the voltages in both are induced by the same means, namely, the electro-magnetic field. The auxiliary windings are arranged as shown in the Figures 11 to 14 so that the voltage induced in the innermost sheaths is lower than that in the conducting element but higher than that in the middle sheaths and the voltage in the middle sheaths is higher than that in the outer sheaths where three sheaths are employed. Similarly where two sheaths are employed the voltage in the inner sheaths is higher than the voltage in the outer sheaths but lower than the voltage in the conducting element.

The induced voltages in the sheaths are in this manner stepped down from within outwards, thus avoiding excessive differences of potential across the insulation and giving a substantially uniform distribution or drop of potential.

Or alternatively all the outer sheaths or some of them are connected in series to form a group, and similarly with the inner and innermost sheaths, such groups or some of them being themselves connected in series if desired.

In such cases the voltages induced in said sheaths are stepped down from within outwards and the potential gradients across the insulation between the various sheaths themselves and between the sheaths and the conducting elements are uniform.

The auxiliary windings, can be employed if desired for generating power at lower voltages and the power so obtained used for auxiliary or local supplies, thus avoiding the use of step-down transformers for this purpose.

The slots in which the windings are placed may be semi-open, completely open and of any desired shape. In some cases the conducting elements themselves may be varied in area to deal with capacity currents.

Although the windings have been described in the two examples given as having one and two conducting elements respectively, any number or shape of conducting elements may be employed.

The present invention has the advantage that the electrical stresses in the insulating material are greatly reduced and can be evenly distributed over the cross section of the insulation and the difficulties encountered in this connection with very high potentials are thus eliminated.

The invention has been described above as applied to dynamo-electric machines, but it can also be usefully applied to other electrical apparatus such as transformers and the like.

Claims.

1. In combination in electrical apparatus having an electro-magnetic field, a main winding consisting of a conducting element and auxiliary windings composed of sheaths surrounding said conducting element and varying in number lengthwise thereof, said conducting element and sheaths being in inductive relation to said field as set forth.

2. A winding for electrical apparatus having an electro-magnetic field comprising in combination a main conducting element, insulation surrounding said conducting element, a plurality of concentric conducting sheaths around said conducting element, insulation separating said sheaths from one another, and means connecting groups of said sheaths in series to form separate auxiliary windings the potentials induced in said sheaths by said field being stepped down from within outwards, as set forth.

3. A winding for electrical apparatus having an electro-magnetic field comprising in combination a main conducting element having a potential increasing along its length induced by said electro-magnetic field, a single concentric conducting sheath surrounding a portion of said element, a plurality of concentric conducting sheaths surrounding other portions of said element having higher potentials, insulation separating said sheaths from one another and from said conducting element, and means associating said sheaths to form separate auxiliary windings in inductive relation to the said field, the potentials induced in said sheaths being stepped down from within outwards, as set forth.

4. A winding for electrical apparatus having an electro-magnetic field comprising in combination a main conducting element, and sheathing means composed of different numbers of sheaths surrounding different portions of the conducting element, certain of said sheathing means associated with different portions of said conducting element being in series, and the voltages induced by said field in said sheaths being stepped down from within outwards, as set forth.

5. In combination in a dynamo-electric machine having an electro-magnetic field and a plurality of slots, a main winding consisting of a plurality of conducting elements situated in said slots, conducting sheaths surrounding certain of said elements and varying in number according to the potential induced in said elements by said field, and means connecting certain of said sheaths together in series to form a plurality of separate auxiliary windings having voltages stepped down from within outwards induced therein by said field, as set forth.

6. In combination a dynamo-electric machine having an electro-magnetic field and a plurality of slots, a main winding including a plurality of conducting elements situated in said slots in inductive relation to said field, and conducting sheaths surrounding certain of said elements in inductive relation to said field and varying in number according to the potentials induced in said elements by said field, means connecting said sheaths together in series, the potentials induced in said sheaths by said field being stepped down from within outwards, as set forth.

7. A winding for electrical apparatus having an electromagnetic field and a number of slots comprising in combination a conducting element having an e. m. f. induced by said field and increasing along its length arranged in said slots, one conducting sheath around a portion of said element in certain slots, two conducting sheaths around another portion of said element in other slots, three sheaths around another portion of said element in further slots, means connecting said single sheaths in series, means connecting said inner sheaths where two are employed in series, means connecting the innermost sheaths where three are employed in series, means connecting said three groups in series to form a single and separate auxiliary winding, means connecting said outer sheaths where two are employed in series, means connecting said inner sheaths where three are employed in series, means connecting said two groups in series to form a second separate and complete auxiliary winding, and means connecting said outer sheaths where three are employed to form a third separate and complete auxiliary winding, voltages induced in said sheaths by said field being stepped down from within outwards, as set forth.

8. A winding for electrical apparatus having an electro-magnetic field comprising in combination a main conducting element having a potential increasing along its length, a single concentric conducting sheath surrounding a portion of said element, two concentric conducting sheaths surrounding another portion of said element, three concentric conducting sheaths surrounding a further portion of said element, insulation separating said sheaths from one another and from said conducting element, the voltages induced in said sheaths by said field being stepped down from within outwards, and means connecting in series the sheaths where one is employed, the inner sheaths where two are employed and the innermost sheaths where three are employed to form a single complete auxiliary winding, as set forth.

In testimony whereof we have signed our names to this specification.

CHARLES ALGERNON PARSONS.
JESSEL ROSEN.